(No Model.)
C. W. ATKINSON & R. MURPHY.
FLUSHING TANK.
No. 354,456. Patented Dec. 14, 1886.
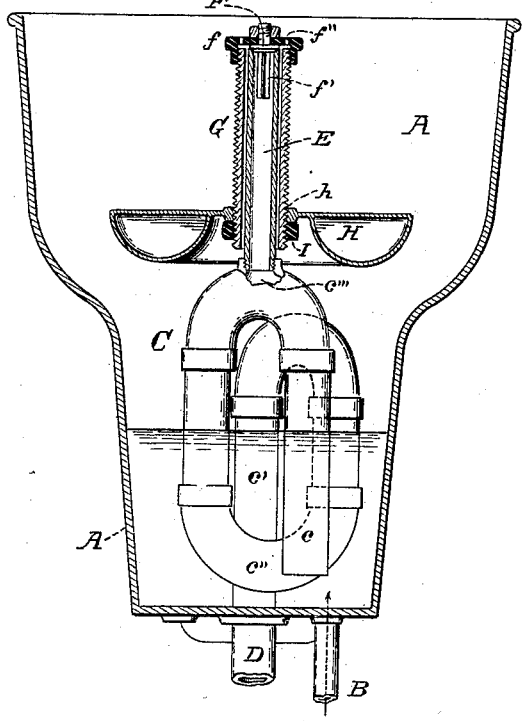
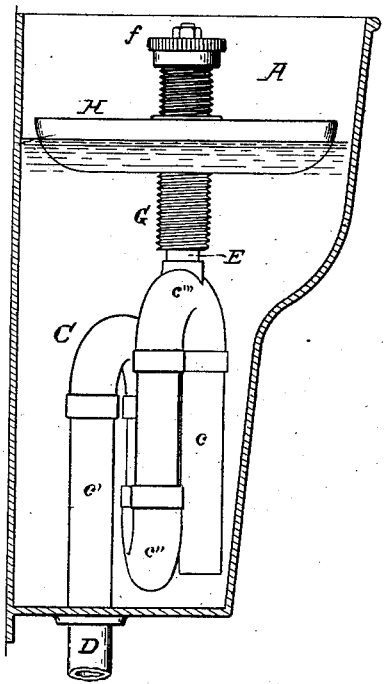
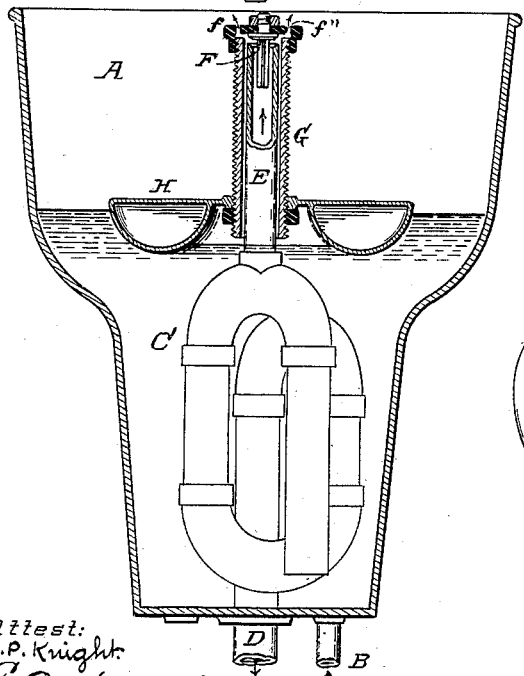
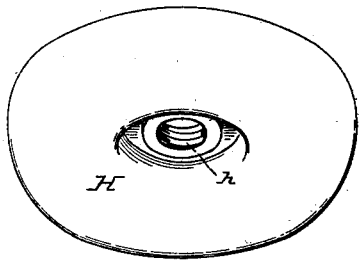
Attest:
A. P. Knight.
F. A. Hopkins
Inventors:
Charles W. Atkinson
Richard Murphy
By Knight Bros.
Atty's.

UNITED STATES PATENT OFFICE.

CHARLES W. ATKINSON AND RICHARD MURPHY, OF CINCINNATI, OHIO.

FLUSHING-TANK.

SPECIFICATION forming part of Letters Patent No. 354,456, dated December 14, 1886.

Application filed April 13, 1886. Serial No. 198,739. (No model.)

*To all whom it may concern:*

Be it known that we, CHARLES W. ATKINSON and RICHARD MURPHY, both of Cincinnati, Hamilton county, Ohio, have invented a new and useful Improvement in Flushing-Tanks, of which the following is a specification.

The object of our invention is to provide an automatic-discharge siphon-tank capable of being adjusted so as to discharge sufficient water for flushing any given number of urinals at once. For this purpose we employ a siphon similar in construction and operation to those shown in Patents No. 210,965, of December 17, 1878, to W. G. Rhoads, and No. 298,805, of May 20, 1884, to H. C. Weeden, and provide such siphon with an adjustable float-valve, whereby the water in the tank may be discharged in any desired quantities.

In the accompanying drawings, Figure 1 is a vertical section of a siphon-tank provided with our adjustable float-valve, the latter being shown closed and the siphon being shown in elevation. Fig. 2 is a similar view of the same with the float-valve open. Fig. 3 is a transverse vertical section of the tank, the siphon and float-valve being shown in elevation. Fig. 4 is an under side perspective view of the annular float.

A represents the tank, which is preferably expanded above and contracted below, as shown. A constant stream of water passes into this tank through a feed-pipe, B. In the lower or contracted portion of the tank is the siphon C, having uptake and downtake legs $c$ and $c'$, connected by a downwardly-projecting U-formed bend or trap, $c''$. The leg $c'$ communicates through the discharge-pipe D with the one or more urinals to be flushed. Rising from the pipe-space $c'''$ between the trap $c''$ and the uptake-leg $c$ is a vent-pipe, E, whose top is above the greatest height ever reached by the water, and forms a seat for a valve, F. This valve is fixed axially to a cap-nut, $f$, into which screws a tube, G, which incloses the pipe E, and is screw-threaded on the outside throughout its length.

H is a float having a central tapped orifice, $h$, so as to enable it to be screwed onto the tube G and adjusted to any height thereon. This float is preferably an annular flat-topped hollow shell, whose bottom has the shape of the lower half of a torus. This form of float is easy to construct and convenient in operation, and is very sensitive, as it displaces a comparatively large quantity of water when immersed nearly to the top, and has then no rounded top portion extending above the water and weighing it down. A stem, $f'$, projecting from the valve, enters the pipe E and guides the valve in its vertical oscillations. A thumb-nut, I, may be used to lock the float to its place upon the screw-tube G. Orifices $f''$ are made in the top of cap-nut $f$, to facilitate the escape of air when the valve is opened.

The float H is adjusted on the screw-tube G, so as to be lifted by the water when sufficient water has accumulated in the tank to flush one or two or more urinals, as the case may be. Up to the top of the siphon the tank holds about enough water for one urinal. Above that point it is expanded, so that a comparatively slight elevation of the float upon the screw-tube is sufficient to adapt it to two, three, or more urinals.

After each discharge sufficient water remains in the trap $c''$ to form an air-lock at $c'''$ as soon as the water begins to rise again. Were this air-lock to remain unbroken, the water in the tank could rise considerably above the top of the siphon before it would force the water out of the trap $c''$ and rush into and fill the siphon; but before it reaches a height sufficient to "break" the trap it lifts the float H, so that the air which is compressed at $c'''$ escapes, the water rushes in to take its place, and, by its momentum, passes into the downtake-leg $c'$, thus filling the siphon, and the water in the tank, being thereby lowered, drops the float-valve and closes the siphon-pipe, which now operates like a common siphon to discharge the tank.

We claim as new and of our invention—

1. In a siphon-tank for flushing urinals, the combination, with a siphon, C, adapted to form an air-lock, of vent-pipe E, leading up from the air-locked portion of the siphon, screw-tube G, carrying valve F for closing said vent-pipe, and float H, screwing on the tube G, so as to be adjustable vertically thereon, substantially as and for the purpose set forth.

2. In a siphon-tank for flushing urinals, the combination of siphon C, vent-pipe E, cap-nut f, carrying valve F, and having orifices f'' and projecting stem f', screw-tube G, depending from said cap-nut and inclosing the pipe E, and annular float H, screwing on said screw-tube, substantially as and for the purposes described.

3. In a siphon-tank for flushing urinals, the combination, with the siphon C and vertically-adjustable float-valve F G H, of the tank A, having an expanded upper portion and a contracted lower portion, united by an offset at the level of the top of the siphon, substantially as and for the purpose explained.

4. The annular float-shell H, having a flat top and semi-torus-shaped bottom, substantially as and for the purpose set forth.

In testimony of which invention we hereunto set our hands.

CHARLES W. ATKINSON.
RICHARD MURPHY.

Attest:
E. M. WILLIAMS,
A. P. KNIGHT.